US007349500B2

(12) United States Patent
Kim

(10) Patent No.: US 7,349,500 B2
(45) Date of Patent: Mar. 25, 2008

(54) COARSE FREQUENCY SYNCHRONIZATION METHOD AND APPARATUS IN AN ORTHOGONAL FREQUENCY DIVISION MULTIPLEXING (OFDM) SYSTEM

(75) Inventor: Kwang-chul Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 616 days.

(21) Appl. No.: 10/971,039

(22) Filed: Oct. 25, 2004

(65) Prior Publication Data

US 2005/0169408 A1 Aug. 4, 2005

(30) Foreign Application Priority Data

Jan. 16, 2004 (KR) ...................... 10-2004-0003234

(51) Int. Cl.
*H04L 27/06* (2006.01)

(52) U.S. Cl. ...................... 375/343; 375/260; 375/261; 375/267

(58) Field of Classification Search ................ 375/260, 375/261, 267, 316, 326, 343, 344, 354, 355, 375/376
See application file for complete search history.

(56) References Cited

U.S. PATENT DOCUMENTS

| | | | | |
|---|---|---|---|---|
| 6,134,286 | A * | 10/2000 | Chennakeshu et al. | 375/365 |
| 6,373,861 | B1 * | 4/2002 | Lee | 370/503 |
| 6,628,606 | B1 * | 9/2003 | Hong et al. | 370/208 |
| 7,088,782 | B2 * | 8/2006 | Mody et al. | 375/260 |

FOREIGN PATENT DOCUMENTS

| | | |
|---|---|---|
| EP | 1 220 505 | 7/2002 |
| EP | 1 460 814 | 9/2004 |
| GB | 2 364 868 | 2/2002 |
| JP | 2000-236322 | 8/2000 |
| JP | 2001-156742 | 6/2001 |
| JP | 2003-134078 | 5/2003 |
| WO | WO 99/17511 | 4/1999 |

OTHER PUBLICATIONS

Wideband Orthogonal Frequency Division Multiplexing (W-OFDM), 2000 Wi-Lan Inc.

(Continued)

*Primary Examiner*—Chieh M. Fan
*Assistant Examiner*—Freshteh N. Aghdam
(74) *Attorney, Agent, or Firm*—Lee & Morse, P.C.

(57) ABSTRACT

An apparatus and method for performing coarse frequency synchronization in an orthogonal frequency division multiplexing (OFDM) receiver includes cyclically shifting a received signal X(k) by a predetermined shift amount d, determining the length of a summation interval according to a phase coherence bandwidth and a number K of sub-bands into which the summation interval is divided, generating and adjusting a symbol time offset according to the number K of sub-bands, generating a weighted phase reference signal Z(k) which is phase-shifted by the symbol time offset and weighted by a weighting vector determined according to a frequency band, partially correlating the shifted signal X(k+d) and the weighted phase reference symbol Z(k) and calculating a partial correlation value for each of the K sub-bands; and determining the shift amount $d_{max}$ at a maximum sum of the partial correlation values and outputs the shift amount $d_{max}$ as an estimated coarse frequency offset.

15 Claims, 5 Drawing Sheets

START
DETERMINE LENGTHS AND NUMBER OF COHERENCE BANDS, ALLOWABLE TIME SYNCHRONIZATION ERROR, CONTROL VALUE FOR WEIGHTING VECTOR, AND RANGE OF FREQUENCY OFFSET ESTIMATION — S410
SHIFT PHASE OF REFERENCE SYMBOL — S420
GENERATE REFERENCE SYMBOL z(k+d) SHIFTED BY SHIFT AMOUNT d — S430
GENERATE WEIGHTED REFERENCE SYMBOL W*z(k+d) — S440
GENERATE WEIGHTED REFERENCE SYMBOL WHOSE PHASE IS DISTORTED BY SYMBOL TIME OFFSET — S450
CALCULATE SUM OF PARTIAL CORRELATION VALUES — S460
S470 (d==off_L)&& (t_i==off_T) — NO / YES
CALCULATE SHIFT AMOUNT $d_{max}$ WHERE THE SUM OF THE PARTIAL CORRELATION VALUES HAS A MAXIMUM VALUE — S480
END

OTHER PUBLICATIONS

Lee et al. "Coarse Symbol Synchronization Algorithms for OFDM Systems in Multipath Channels", 2002, pp. 446-448.

Muller et al. "Analysis of a Frame- and Frequency Synchronizer for (Bursty) OFDM", 1998, pp. 201-206.

Bang (I), et al., "A Coarse Frequency Offset Estimation in an OFDM System Using the Concept of the Coherence Phase Bandwidth", IEEE International Conference on Communications, vol. 2 of 3, pp. 1135-1139, (Jun. 18, 2000).

Bang (II), et al., "A Coarse Frequency Offest Estimation in an OFDM System Using the Concept of the Coherence Phase Bandwidth", IEEE Transactions on Communications, vol. 49, No. 8, pp. 1320-1324, (Aug. 2001).

You, et al., "Low-complexity Coarse Frequency-offset Synchronization for OFDM Applications", IEEE International Conference on Communications, vol. 1 of 10, pp. 2494-2498 (Jun. 11, 2001).

Cho, et al. "PC-Based Receiver for Eureka-147 Digital Audio Broadcasting", IEEE Transactions on Broadcasting, vol. 47, No. 2, pp. 95-102, (Jun. 2001).

Hsieh, et al., "A Frequency Acquisition Scheme for OFDM Systems" IEEE International Symposium on Personal, Indoor, and Mobile Radio Communications, vol. 3, pp. 843-847, (Oct. 1996).

* cited by examiner

RF RECEIVER
105
AD CONVERTER
110
I/Q FILTER
115
FREQUENCY CORRECTION UNIT
120
DIGITAL AFC
121
S/P CONVERTER
122
GI REMOVER
123
FFT UNIT
125
SUB-CARRIER DEMODULATOR
130
DEINTER-LEAVER
135
VITERBI DECODER
140
OFDM DEMODULATION UNIT
OFDM SYNCHRONIZATION UNIT
FRAME SYNCHRONIZER
150
SYMBOL SYNCHRONIZER
155
COARSE FREQUENCY SYNCHRONIZER
160
FINE FREQUENCY SYNCHRONIZER
165

320
WEIGHTED PRS GENERATING UNIT
321
REFERENCE SYMBOL GENERATOR
322
WEIGHTED REFERENCE SYMBOL GENERATOR
323
WEIGHTING VECTOR TABLE STORAGE UNIT
324
PHASE SHIFT GENERATOR
Δti
325
MULTIPLICATION UNIT
326
REFERENCE SYMBOL BUFFER
330
CONTROLLER
310
COARSE FREQUENCY OFFSET ESTIMATING UNIT
311
SYMBOL BUFFER
312
PARTIAL CORRELATION UNIT
313
PARTIAL CORRELATION CONTROLLER
314
OFFSET ESTIMATOR

COARSE FREQUENCY SYNCHRONIZATION METHOD AND APPARATUS IN AN ORTHOGONAL FREQUENCY DIVISION MULTIPLEXING (OFDM) SYSTEM

BACKGROUND OF THE INVENTION

1. Field of the Invention

The present invention relates to the field of orthogonal frequency division multiplexing (OFDM) technology. More particularly, the present invention relates to a coarse frequency synchronization method and apparatus in an OFDM receiver.

2. Description of the Related Art

OFDM technology relates to digital modulation for satisfactorily minimizing interference by multiple-path or fading channels near each other in frequency. In particular, since OFDM technology has excellent spectrum efficiency, much research is conducted regarding its application to various fields of wireless communications. However, OFDM technology is vulnerable to frequency synchronization and symbol timing synchronization. OFDM technology has been adopted as a standard by a European digital video broadcasting (DVB) method, the IEEE 802.11a standard that is a wide-band wireless local area network (LAN) that supports transmission of a signal at a speed of 20 Mbps or more, and a physical layer of a high performance LAN (HIPERLAN/2) suggested by broadband radio access network (BRAN) European Telecommunications Standard Institute (ETSI). In particular, a coarse frequency synchronization method is applicable to the European DVB.

In a conventional frequency synchronization method, a correlation value is obtained by determining the length of a summation interval according to a phase coherence bandwidth, dividing it into sub-bands, computing correlation values for the respective sub-bands, and averaging the correlation values, so as to supplement a correlation bandwidth reduced by a frame synchronization offset. In this way, it is possible to solve problems caused by the frame synchronization offset, thus enabling coarse frequency synchronization. However, this method is substantially difficult to be realized, since a sample offset must be compensated for within a range of ±15 samples.

SUMMARY OF THE INVENTION

The present invention is therefore directed to a coarse frequency synchronization method and apparatus in an orthogonal frequency division multiplexing (OFDM) receiver, which substantially overcome one or more of the problems due to the limitations and disadvantages of the related art.

It is therefore a feature of an embodiment of the present invention to provide a coarse synchronization method and apparatus in an OFDM receiver which performs stable frequency synchronization.

It is another feature of an embodiment of the present invention to provide a coarse synchronization method and apparatus which uses a small amount of computation.

At least one of the above and other features and advantages of the present invention may be realized by providing a coarse frequency synchronization apparatus of an orthogonal frequency division multiplexing (OFDM) receiver, including a buffer that receives a demodulated signal X(k) and outputs a shifted signal X(k+d) generated by cyclically shifting the signal X(k) by a predetermined shift amount d, a controller that determines a length of a summation interval according to a phase coherence bandwidth and a number K of sub-bands into which the summation interval is divided, and generates and adjusts a symbol time offset according to the number K of sub-bands, a weighted phase reference signal (PRS) generating unit that generates a weighted phase reference signal Z(k) whose phase is shifted by the symbol time offset and that is weighted by a weighting vector determined according to a frequency sub-band, a counter that counts the shift amount d, a partial correlation unit that receives the shifted signal X(k+d) and the weighted phase reference signal Z(k), calculates a partial correlation value for each of the K sub-bands, and an offset estimator that calculates the shift amount $d_{max}$ where the sum of the partial correlation values is a maximum and outputs the shift amount $d_{max}$ as an estimated coarse frequency offset value.

The partial correlation unit may calculate the partial correlation value for each sub-band using the equation $$\sum_{m=0}^{K-1} \left| \sum_{k=m(N/K)}^{(m+1)(N/K)-1} X(k) W_m Z(((k+d))_N) \right|,$$

wherein N is a number of subcarriers and the predetermined shift amount d is between $$-\frac{2}{N} \text{ and } \frac{2}{N}.$$

The weighted PRS generating unit may include a reference symbol generator that generates a reference symbol, a reference symbol generator that weights the reference symbol using the weighting vector, a phase shift generating unit that shifts the phase of the reference symbol by the symbol time offset and outputs a phase-shifted reference symbol, and a multiplication unit that multiplies the weighted reference symbol by the phase-shifted reference symbol and outputs a result of multiplication as the weighted phase reference signal Z(k).

The phase shift generating unit may generate a complex number corresponding to each of a plurality of subcarriers, by which a phase is rotated, and multiply the generated complex number by the reference symbol to generate the phase-shifted reference symbol. The weighting vector may include a first weight allocated to a first sub-band of a first frequency and a second weight allocated to a second sub-band of a second frequency, wherein the first frequency is higher than the second frequency and the first weight is higher than the second weight.

The number K of sub-bands may be set to be less than $2T_{off}$ where $T_{off}$ is a maximum time offset for which frame synchronization can be achieved. The weights in the weighting vector may be directly proportional to frequencies of a corresponding frequency sub-band.

At least one of the above and other features and advantages may be realized by providing a coarse frequency synchronization method for use in an orthogonal frequency division multiplexing (OFDM) receiver, including receiving a demodulated symbol X(k) and outputting a shifted symbol X(k+d) generated by cyclically shifting the symbol X(k) by a predetermined shift amount d, determining a length of a summation interval according to a phase coherence bandwidth and a number K of sub-bands into which the summation interval is divided, and generating a symbol time offset according to the number K of sub-bands, generating a reference symbol Z(k) whose phase is shifted by the symbol time offset and that is weighted by a weighting vector determined according to a frequency sub-band, counting the shift amount d, calculating a partial correlation value between the shifted symbol X(k+d) and the weighted phase reference signal Z(k) for each of the K sub-bands, and finding a shift amount $d_{max}$ where the partial correlation value is a maximum and outputting the shift amount $d_{max}$ as an estimated coarse frequency error value.

The partial correlation value may be calculated for each sub-band using the equation $$\sum_{m=0}^{K-1}\left|\sum_{k=m(N/K)}^{(m+1)(N/K)-1} X(k)W_m Z(((k+d))_N)\right|,$$

where N is a number of subcarriers and the predetermined shift amount d is between $$-\frac{2}{N} \text{ and } \frac{2}{N}.$$

The generating the weighted phase reference signal may include generating a reference symbol, weighting the reference symbol using the weighting vector, outputting a phase-shifted reference symbol whose phase is distorted by shifting the phase of the reference symbol by the symbol time offset, and multiplying the weighted reference symbol by the phase-shifted reference symbol and outputting a result of multiplication as the weighted phase reference signal Z(k).

The phase shifting of the reference symbol may include generating a complex number corresponding to each of a plurality of subcarriers, by which a phase is rotated, and the generated complex number is multiplied by the reference symbol to generate the phase-shifted reference symbol.

The reference symbol may be weighted using the weighting vector including a first weight allocated to a first sub-band of a first frequency and a second weight allocated to a second sub-band of a second frequency, wherein the first frequency is higher than the second frequency and the first weight is higher than the second weight. At least two of the steps on the reference symbol may be performed simultaneously.

The number K of sub-bands may be set to be less than $2T_{off}$ where $T_{off}$ is a maximum time offset for which frame synchronization can be achieved. The weights in the weighting vector may be directly proportional to frequencies of a corresponding frequency sub-band.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
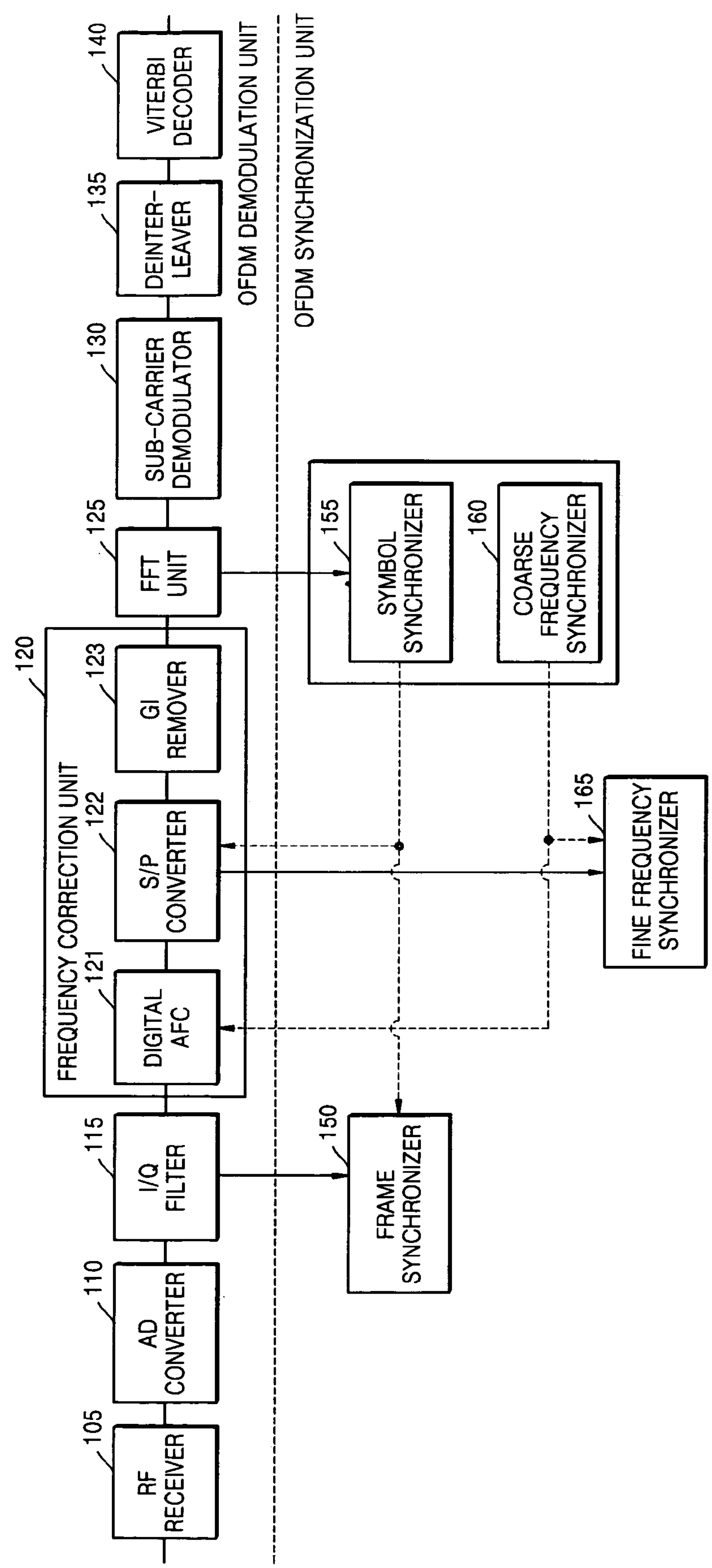
FIG. 1 is a block diagram illustrating an orthogonal frequency division multiplexing (OFDM) receiver according to an embodiment of the present invention.

Korean Patent Application No. 2004-3234, filed on Jan. 16, 2004, in the Korean Intellectual Property Office, and entitled: "Coarse Frequency Synchronization Method and Apparatus in OFDM System," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

FIG. 1 is a block diagram of an orthogonal frequency division multiplexing (OFDM) receiver according to an embodiment of the present invention. The OFDM receiver includes an OFDM demodulation unit and an OFDM synchronization unit. The OFDM demodulation unit includes a radio frequency (RF) receiver 105, an analog-to-digital (AD) converter 110, an in-phase/quadrature (I/Q) filter 115, a frequency correction unit 120, a fast Fourier transform (FFT) unit 125, a sub-carrier demodulator 130, a deinterleaver 135, and a Viterbi decoder 140. When an RF signal is input to the RF receiver 105, the received RF signal is quantized by the AD converter 110. The I/Q filter 115 then separates the quantized RF signal into an in-phase (I) component and a quadrature (Q) component. The frequency correction unit 120 corrects a frequency error of the signal filtered by the I/Q filter 115. The frequency correction unit 120 includes a digital automatic frequency controller (AFC) 121, a serial to parallel (S/P) converter 122, and a guide interval (GI) remover 123.

The OFDM synchronization unit performs time synchronization and frequency synchronization. The OFDM synchronization unit includes a frame synchronizer 150, a symbol synchronizer 155, a coarse frequency synchronizer 160, and a fine frequency synchronizer 165. The OFDM synchronization unit uses the frame synchronizer 150 and the symbol synchronizer 155 for time synchronization, and uses the coarse frequency synchronizer 160 and the fine frequency synchronizer 165 for frequency synchronization.

To aid in understanding a coarse frequency apparatus and method according to the present invention, a correlation value and a phase coherence bandwidth applied in this invention will now be described.

First, to identify the effect of carrier frequency error of a received signal, it is assumed that the k-th subcarrier received frequency of the received signal is $f_k+f_{off}$, where $f_k$ is a frequency of the k-th sub-carrier and $f_{off}$ is a frequency offset. A frequency offset is expressed as a multiple of a subcarrier frequency interspacing. In general, the frequency offset includes an offset expressed as an integer multiple of the subcarrier frequency interspacing and an offset expressed as decimal multiples thereof, which are separately processed. Thus, each term of $f_k+f_{off}$ is defined as follows:

$$f_k = \frac{k}{T_s} \tag{1}$$

$$f_{off} = \Delta f \frac{1}{T_s} = (\Delta f_i + \Delta f_f)\frac{1}{T_s}$$

where Δf is the frequency offset of a subcarrier expressed by a multiple of subcarrier frequency interspacing, and $T_s$ is a signal period. Also, Δf can be replaced with the sum of an integer $\Delta f_i$ and a floating decimal $\Delta f_f$ that satisfies the condition $-½<\Delta f_f<½$. Given this condition, a received signal r of an n-th symbol is defined by Equation (2). Here, noise has been neglected for convenience in expanding the equation.

$$\begin{aligned} r_{n(m)} &= \sum_{k=0}^{N-1} C_{n,k} e^{j2\pi\left(\frac{k}{T_s}+(\Delta f_i+\Delta f_f)\frac{1}{T_s}\right)\frac{T_s}{N}m} \\ &= \sum_{k=0}^{N-1} C_{n,k} e^{j2\pi(k+\Delta f_i+\Delta f_f)\frac{m}{N}} \end{aligned} \tag{2}$$

where $C_{n,k}$ denotes an n-th symbol of the k-th subcarrier in the frequency domain and N denotes the number of subcarriers.

Meanwhile, when an integer multiple of the frequency offset is zero, i.e., $\Delta f_i=0$, a demodulated signal $\hat{C}'_{n,p}$ is given by Equation (3):

$$\begin{aligned} \hat{C}'_{n,p} &= \frac{1}{N}\sum_{m=0}^{N-1} r_n(m) e^{-j2\pi mp/N} \\ &= \frac{1}{N}\sum_{m=0}^{N-1}\sum_{k=0}^{N-1} C_{n,k} e^{j2\pi(k+\Delta f_f)m/N} e_{-}^{j2\pi mp/N} \\ &= \frac{1}{N}\sum_{k=0}^{N-1} C_{n,k} \sum_{m=0}^{N-1} e^{j2\pi(k+\Delta f_f-p)m/N} \\ &= \frac{1}{N}\sum_{k=0}^{N-1} c_{n,k}\left\{ e^{j\pi(p-k-\Delta f_f)} \frac{\sin(\pi(p-k-\Delta f_f)}{N\sin(\pi/N(p-k-\Delta f_f}\right\} \end{aligned} \tag{3}$$

The demodulated signal $\hat{C}'_{n,p}$ in Equation (3) is calculated only when k is an integer. Thus, if the frequency offset $\Delta f_f$ is zero, the amplitude of the demodulated signal $\hat{C}'_{n,p}$ is non-zero only at a frequency where k equals p, and is zero at all other frequencies, thus maintaining orthogonality among frequencies. However, if the frequency error $\Delta f_f$ is non-zero, the amplitude of the demodulated signal $\hat{C}'_{n,p}$ is reduced even when k equals p, and the amplitude of the demodulated signal $\hat{C}'_{n,p}$ becomes not zero at other frequencies. These phenomena cause interference between subcarriers, leading to inter-channel interference (ICI). The demodulated signal $\hat{C}_{n,p}$ is obtained from the received signal of Equation (2) as follows:

$$\begin{aligned} \hat{C}_{n,p} &= \frac{1}{N}\sum_{m=0}^{N01} r_n(m) e^{-j2\pi p/N} \\ &= \frac{1}{N}\sum_{m=0}^{N-1}\sum_{k=0}^{N-1} C_{n,k} e^{j2\pi km/N} e^{j2\pi(\Delta f_f)m/N} e^{-j2\pi m(p-\Delta f_f)/N} \\ &= \hat{C}_{n,p-\Delta f_i} \end{aligned} \tag{4}$$

This demonstrates that when the frequency offset is an integer multiple of a subcarrier frequency, a signal intended for demodulation is shifted by $-\Delta f_i$, where $\Delta f_i$ is an integer. Since Equation (4) includes a discrete Fourier transform (DFT) process, the shift in this equation is cyclic.

Thus, in a coarse frequency synchronization method according to the present invention, a correlation value is calculated by sequentially rotating the already known phase reference signal and received signal by symbol intervals, and the amount of rotation where the maximum correlation value occurs is determined as an integer multiple of a frequency offset. This relationship is defined by Equation (5):

$$\max_d \left\{ \sum_{k=0}^{N-1} X(((k+d))_N) Z^*(k) \right\} \tag{5}$$

where $((k+d))_N$ represents a modulo-N summation operation, X(k) is the k-th received signal after performing DFT, and Z(k) is the k-th phase reference signal. Also, X(k) and Z(k) are frequency domain signals.

While this method can correct a frequency offset when frame synchronization occurs, this method cannot correct a frequency offset when frame synchronization has not been realized. In accordance with an embodiment of the present invention, this problem can be solved by analyzing a phase coherence bandwidth for the received signal and the phase reference signal.

The phase coherence bandwidth for the received signal and phase reference signal in a digital audio broadcasting (DAB) system using OFDM will now be described as an example. In general, channel coherence bandwidth refers to a statistically measured frequency band where a channel can be deemed as “flat,” i.e., passing signals so that they have approximately the same gain and linear phase over an entire spectrum. That is, a channel coherence bandwidth is a frequency band within which two different arbitrary frequency components have a strong correlation therebetween. In this case, assuming that the coherence bandwidth of a channel is $B_c$, two sinusoidal wave signals having a frequency spacing larger than that of coherence bandwidth $B_c$ are affected differently within the channel. Thus, the correlation between these two received signals cannot be ensured.

A phase coherence bandwidth is defined as a frequency interval where two signals having a delay in the time domain and generated by performing a DFT on the same signal maintain their correlation in the frequency domain. Analogous to the channel coherence band, it can also mean a frequency band, corresponding to the phase coherence bandwidth, within which any two signals have a strong correlation.

Let a time domain signal in the OFDM system be z(t), a delayed signal having a frame synchronization offset of $T_{off}$ with respect to z(t) be $z(t+T_{off})$, and a frequency domain signal that has undergone DFT be Z(k), a signal generated by performing DFT on $z(t+T_{off})$ is given by Equation (6):

$$DFT\{z(t+T_{off})\}=\sum_{k=0}^{N-1} e^{j2\pi kT_{off}/N}Z(k) \tag{6}$$

Here, for convenience in expanding the equation, both noise and frequency offset are ignored, and N is the number of subcarriers.

As described above, the phase coherence bandwidth is defined as a frequency band within which two signals always have a strong correlation. That is, a frequency band B having the largest bandwidth where a correlation value of the two signals Z(k) and $e^{j2\pi kT_{off}/N}Z(k)$ is always greater than or equal to a threshold is the a phase coherence bandwidth. This relationship is expressed by Equation (7):

$$\left|\sum_{k=m}^{m+B-1} Z^*(k)e^{j2\pi T_{off}/N}Z(k)\right| \geq T_c,\ \text{for all } m \tag{7}$$

$$\text{if } 0 \leq m \leq N-B,\ 0 \leq B \leq N$$

where $T_c$ is a threshold and N denotes the number of subcarriers. If an OFDM signal satisfies $|z(k)|=1$, the left side of Equation (7) can be expanded as shown in Equation (8):

$$\left|\sum_{k=m}^{m+B-1} Z^*(k)e^{j2\pi T_{off}/N}Z(k)\right| = \left|\sum_{k=m}^{m+B-1} e^{j2\pi T_{off}/N}\right| = \sqrt{\left|\sum_{k=m}^{m+B-1}\cos(2\pi kT_{off}/N)\right|^2+\left|\sum_{k=m}^{m+B-1}\sin(2\pi kT_{off}/N)\right|^2} \tag{8}$$

$$0 \leq m \leq N-B,\ 0 \leq B \leq N$$

These conditions are applicable to a DAB system. Since in Equation (8), the lower bound m of the summations is not fixed, the relation between the frame synchronization offset $T_{off}$ and a summation interval k is not clear. Thus, Equation (8) can be rewritten as Equation (9), in which the summations have a lower bound of zero, i.e., to be independent of the start position m.

$$\sqrt{\left|\sum_{k=m}^{m+B-1}\cos(2\pi kT_{off}/N)\right|^2+\left|\sum_{k=m}^{m+B-1}\sin(2\pi kT_{off}/N)\right|^2} = \sqrt{\left(\sum_{k=0}^{B-1}\cos 2\pi kT_{off}/N\right)^2+\left(\sum_{k=m}^{B-1}\sin 2\pi kT_{off}/N\right)^2} \tag{9}$$

Furthermore, Equation (9) can be combined with Equation (7) to yield Equation (10), which can be used to obtain a phase coherence bandwidth with respect to changes in a frame synchronization offset:

$$\sqrt{\left(\sum_{k=0}^{B-1}\cos 2\pi kT_{off}/N\right)^2+\left(\sum_{k=m}^{B-1}\sin 2\pi kT_{off}/N\right)^2} \geq T_C \tag{10}$$

The left side of Equation (10) is a correlation function of original signal z(t) and delayed signal $z(t+T_{off})$, having a frame synchronization offset of $T_{off}$, in the frequency domain with respect to the summation interval k. That is, the phase coherence bandwidth refers to a frequency band B where the correlation function of the two signals having the frame synchronization error $T_{off}$ expressed in Equation (10) is always greater than or equal to the threshold $T_C$.

Meanwhile, it is assumed that z(t) and x(t) are a reference signal and a received signal generated by performing an inverse fast Fourier transform (IFFT) on the phase reference signal Z(k) and signal X(k) in Equation (5), respectively. It is further assumed that the received signal x(t) has a time delay, i.e., frame synchronization error. Given these assumptions, there is a reciprocal relation between a frame synchronization error $\Delta t$ and a phase coherence bandwidth on the frequency axis. This relationship means that as the frame synchronization error $\Delta t$ increases, the phase coherence bandwidth on the frequency axis decreases.

The coarse frequency synchronization method according to an embodiment of the present invention is based on coarse frequency synchronization using a correlation value between reference signals. When calculating a correlation value according to the present invention, a summation interval BWLen is set to be smaller than a phase coherence bandwidth B calculated for a reference signal and a received signal having a time offset. That is, in order to calculate a correlation value between a shifted received signal and reference signal, the summation interval is divided into a plurality of intervals that are smaller than a phase coherence bandwidth of two signals, partial correlation values are calculated for each small interval resulting from the division, and an average or sum of the partial correlation values is taken to determine a shift amount where the maximum correlation value is generated.

Since this method excludes a non-coherence band where accurate frame synchronization between reference and received signals is not achieved, the correlation function value is always meaningful. Thus, coarse frequency synchronization is accurately performed within a time offset range that can be ensured by frame synchronization. These principles are applied to the coarse frequency synchronization apparatus and method of the present invention.

Furthermore, in order to estimate a coarse frequency error, the present invention generates a predistorted phase reference signal. First, the effect of signal distortion with respect to a time offset will now be described with reference to FIG. 2.

Figure 2:
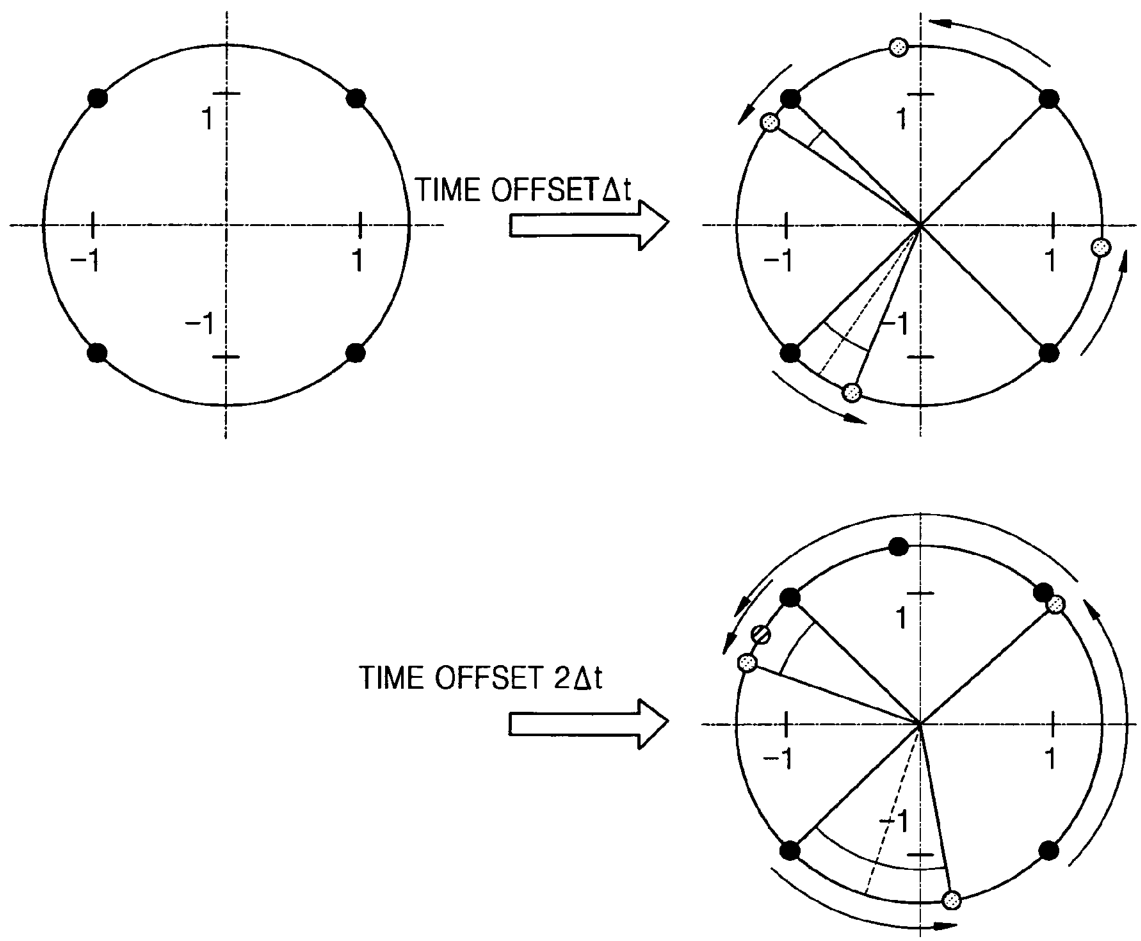
FIG. 2 illustrates the effect of symbol distortion caused by a time frequency error.

As shown in FIG. 2, a time offset in OFDM causes phase rotation in proportion to the order of a subcarrier in a sequence of subcarriers. For mathematical convenience, it is assumed that only one symbol interval of the entire signal is used, a transmission channel is an additive white Gaussian noise (AWGN) channel, and accurate frequency synchronization in a received signal is achieved. If time synchronization does not occur in an OFDM system, a received signal $r_n(t)$ in the n-th symbol interval is defined by Equation (11):

$$r_n(t) = \sum_{k=0}^{N-1} C_{n,k}\Psi'_{n,k}(t) + n(t) \tag{11}$$

where N is the number of subcarriers, $C_{n,k}$ is a signal in the n-th symbol transmitted through the k-th subcarrier, $\psi_{n,k}'$ is the k-th subcarrier signal, and n(t) is AWGN with variance $\sigma_n^2$.

Equation (11) can be rewritten as Equation (12):

$$r_n(t) = \sum_{k=0}^{N-1} C_{n,k}e^{j2\pi f_k t} + n(t) \tag{12}$$

where $f_k$ is a subcarrier frequency defined as $f_k=k/T_s$.

Here, in order to observe the effect of time synchronization on the received signal, it is assumed that sampling is performed with a period $$t = \frac{T_s}{N}m + \tau.$$

In this case, $T_s$ is an OFDM signal period, m is the sampling order, and $\tau$ is a sampling error, i.e., a time offset.

While satisfying the above conditions, a discrete signal generated by sampling the received signal expressed in Equation (12) is given by Equation (13):

$$\begin{aligned} r_n(m) &= \sum_{k=0}^{N-1} C_{n,k}e^{j2\pi\frac{k}{T_s}\left(\frac{T_s}{N}m+\tau\right)} + n(m) \\ &= \sum_{k=0}^{N-1} C_{n,k}e^{j2\pi km/N}e^{j2\pi k\tau/T_s} + n(m) \end{aligned} \tag{13}$$

A demodulated signal $\hat{C}_{n,p}$ obtained from the received signal is thus expressed by Equation (14):

$$\begin{aligned} \hat{C}_{n,p} &= \frac{1}{N}\sum_{m=0}^{N-1} r_n(m)e^{-j2\pi mp/N} \\ &\sum_{m=0}^{N-1} C_{n,k}e^{j2\pi k\tau/T_s}\frac{1}{N}\sum_{m=0}^{N-1} e^{j2\pi m(k-p)/N} + \hat{n}(p) \end{aligned} \tag{14}$$

Here $$\sum_{k=0}^{N-1} e^{j2\pi m(k-p)/N}$$

is expressed by Equation (15):

$$\sum_{m=0}^{N-1} a^m = \begin{cases} N, & \text{if } a = 1 \\ \dfrac{1-a^N}{1-a}, & \text{if } a \neq 1 \end{cases} \tag{15}$$

Here, a in Equation (15) is given by Equation (16):

$$a=e^{j2\pi(k-p)/N} \tag{16}$$

That is, since k, p, and N are all integers in Equation (16), k−p needs to be an integer multiple of N such that a=1. Otherwise, $a^N$=1 for any value of a satisfying a≠1 results in zero, as shown in Equation (17):

$$\sum_{m=0}^{N-1} e^{j2\pi m(k-p)/N} = \begin{cases} N, & \text{if } k = p + \alpha N,\ \alpha \text{ is integer} \\ 0, & \text{otherwise} \end{cases} \tag{17}$$

Since it is possible to apply the conditions of Equation (17) to Equation (14) only if $\alpha$=0, the result is expressed by Equation (18):

$$\begin{aligned} \hat{C}_{n,p} &= \sum_{k=0}^{N-1} C_{n,k}e^{j2\pi k\tau/T_s}\frac{1}{N}\sum_{k=0}^{N-1} e^{j2\pi m(k-p)/N} + \hat{n}(p) \\ &= \sum_{k=0}^{N-1} C_{n,k}e^{j2\pi k\tau/T_s}\frac{1}{N}\cdot N\cdot\delta(k-p) + \hat{n}(p) \\ &= C_{n,p}e^{j2\pi p\tau/T_s} + \hat{n}(p) \end{aligned} \tag{18}$$

Furthermore, the term $\hat{n}(p)$ in Equation (14) that is a value generated by converting noise n(m) to a frequency domain is AWGN having the same variance as the noise n(m) that is also AWGN. Thus, the effect of noise is not directly related to time synchronization of an OFDM signal.

Therefore, it is evident from Equation (18) that, due to the effect of an offset occurring when time synchronization is not achieved, the received signal $\hat{C}_{n,p}$ is demodulated by rotating the phase of a transmission signal $C_{n,p}$ to be demodulated. In this case, the amount of phase rotation is determined as a value proportional to the product of a time offset sand the position p of a subcarrier.

That is, the received signal in Equation (18) suffers phase rotation due to a time offset. The phase is rotated by $\tau\times p$ in proportion to the order p of subcarriers. Thus, the present invention generates a phase reference signal, whose phase has been pre-distorted or shifted, and uses the phase reference signal in detecting coarse frequency synchronization, thus allowing more accurate frequency synchronization detection. Here, $\tau$ corresponds to a signal time offset $\Delta t_i$ that will be described later.

A coarse frequency synchronization apparatus according to an embodiment of the present invention includes a controller that controls a weighting vector to generate a phase reference signal weighted during estimating a coarse frequency error, and a weighted phase reference signal generator that generates the reference signal using the weighting vector. The controller and the weighted phase reference signal generator will now be described in detail with reference to FIG. 3.

Figure 3:
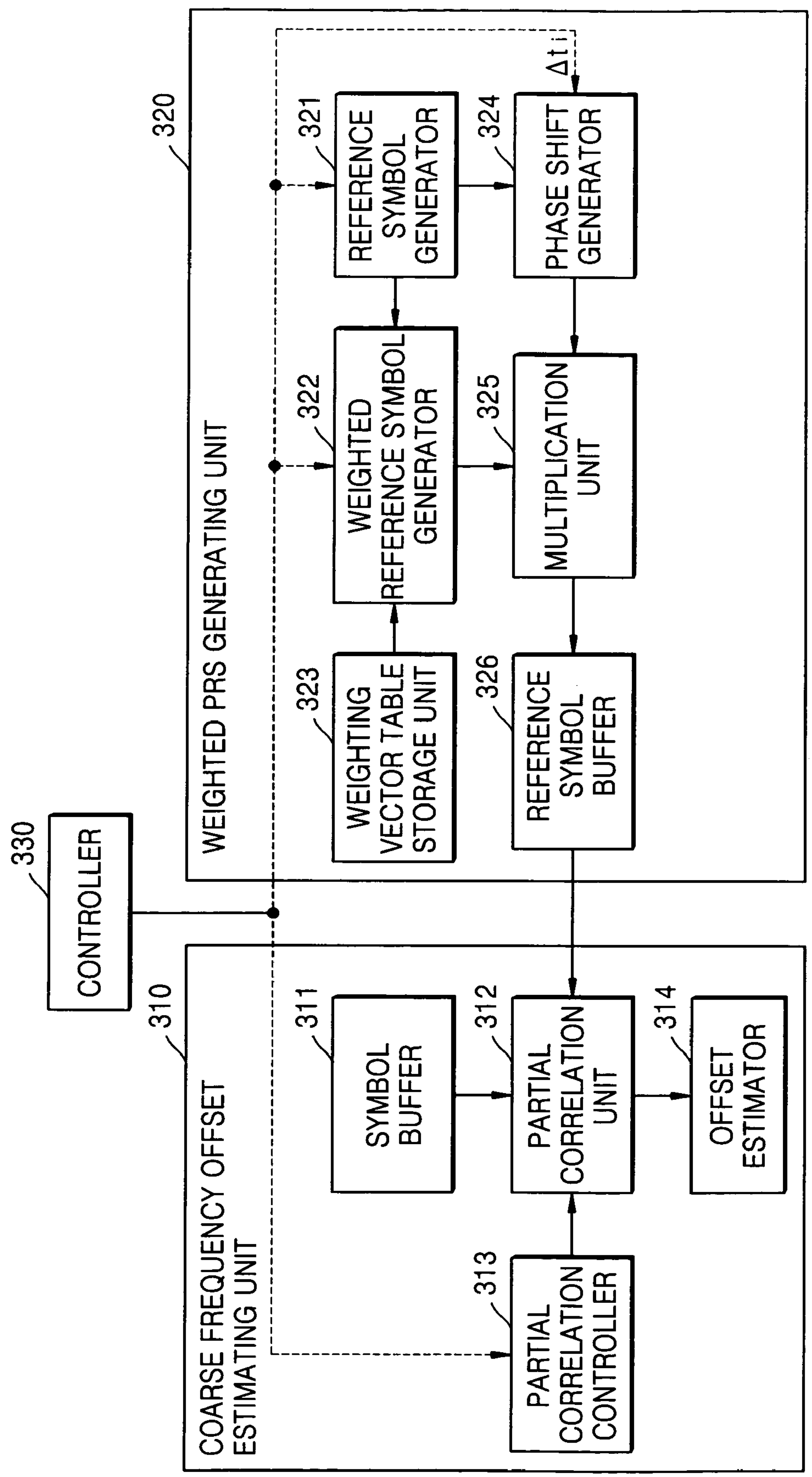
FIG. 3 is a block diagram illustrating a coarse frequency synchronization unit according to an embodiment of the present invention.

FIG. 3 is a block diagram of a coarse frequency synchronization apparatus according to an embodiment of the present invention. The coarse frequency synchronization apparatus of FIG. 3 includes a coarse frequency offset estimating unit 310, a weighted phase reference signal (PRS) generating unit 320, and a controller 330. The phase reference signal may also be referred to as a reference symbol.

A symbol buffer 311 performs a FFT on received signal data and stores a result of the FFT. A partial correlation unit 312 calculates a correlation value. The partial correlation controller 313 receives information regarding lengths and a number of coherence bands from the controller 330 and sends it to the partial correlation unit 312. An offset estimator 314 estimates a frequency offset using a maximum correlation value. A reference symbol generator 321 generates a reference symbol defined by a system. A weighted reference symbol generator 322 generates a weighted reference symbol using a weighting vector stored in a weighting vector table storage unit 323. A phase shift generator 324 receives a control signal for an allowable time synchronization error and generates a phase shift value using the control signal. A multiplication unit 325 multiplies the weighted reference symbol by the phase shift value and a reference symbol buffer 326 stores a result of multiplication as the weighted phase-shifted reference signal. The controller 330 controls an overall operation of the coarse frequency synchronization apparatus including the phase shift generator 324.

More specifically, the controller 330 controls the lengths of and a number of coherence sub-bands for partial correlation, controls the weighted reference symbol generator 321 to apply the weighting vector table thereto, controls the phase shift generator 324 to pre-distort or shift the reference symbol, and controls the amount of rotation required to generate the reference symbol by the reference symbol generator 321.

Figure 4:
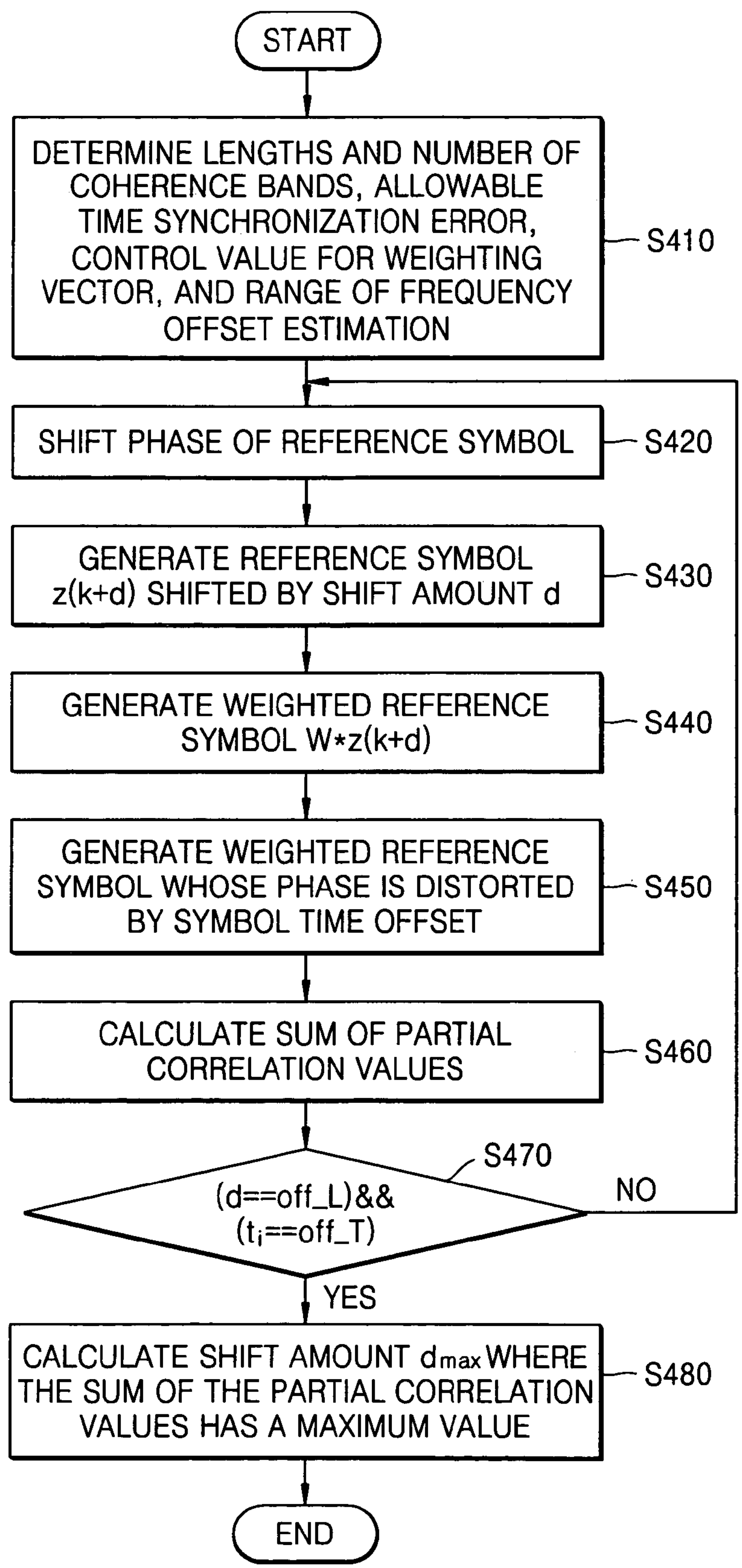
FIG. 4 is a flowchart illustrating a coarse frequency synchronization method according to an embodiment of the present invention.

FIG. 4 is a flowchart illustrating a coarse frequency synchronization method according to an embodiment of the present invention. In this method, a loop for computing an overall correlation value is repeated a number of times to estimate a frequency error using a control signal generated by a controller. When the number of times to estimate the frequency error falls within a range off_L of frequency offset estimation and a range off_T of allowable time synchronization offset, the loop is completed and a frequency offset that is an integer multiple is estimated using a coarse frequency offset estimator, described in detail below.

Figure 5A:
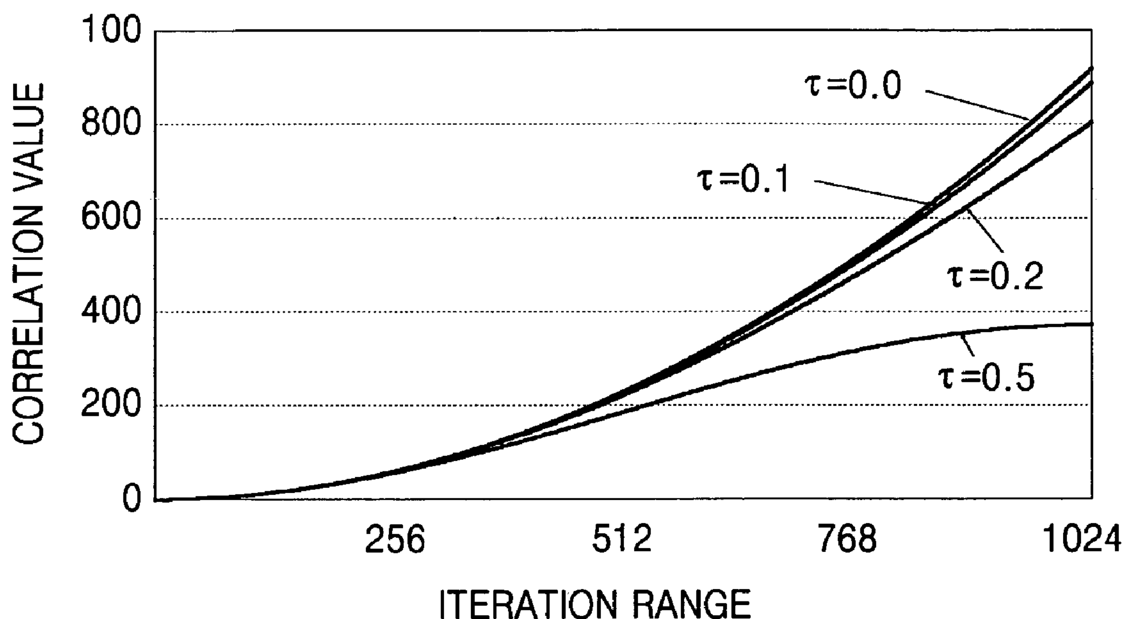
FIGS. 5A and 5B are graphs illustrating the correlation between a reference symbol and a received symbol with respect to changes in a symbol time offset.
Figure 5B:
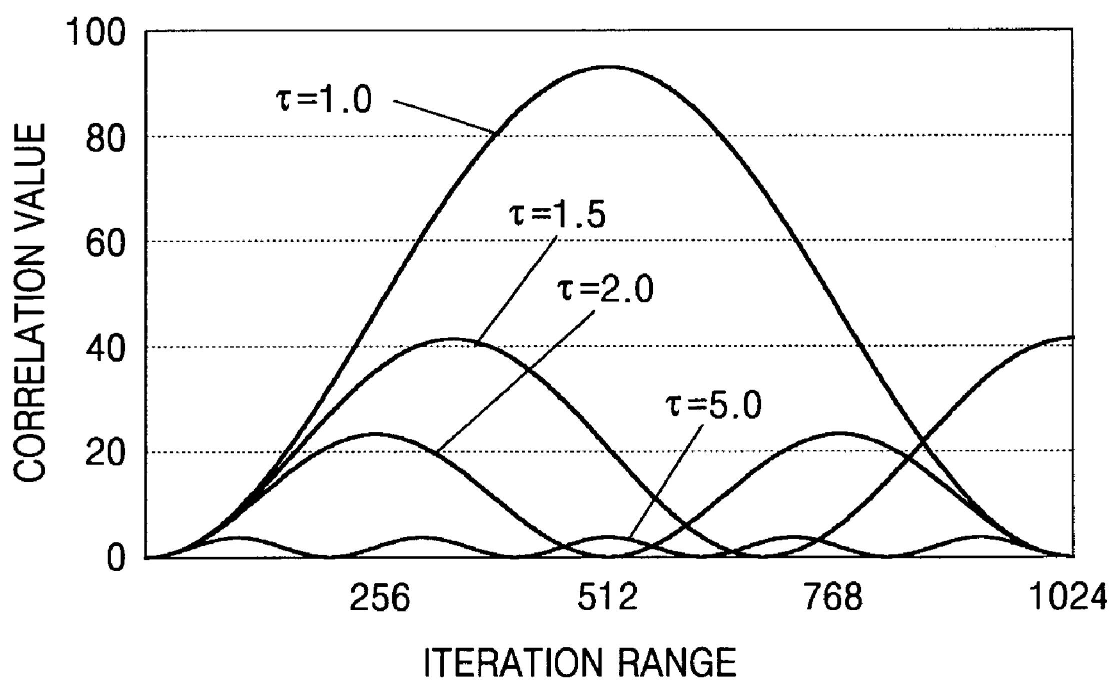

FIGS. 5A and 5B illustrate that a correlation between sub-bands of a coherence bandwidth increases towards the start of the coherence bandwidth and decreases towards the end thereof. Therefore, a weighting vector is determined such that a large weight is generated and applied to the reference symbol in a low-frequency band of an OFDM symbol period and a small weight is generated and applied to the reference symbol in a high-frequency band thereof.

Although a size of the weighting vector can be equal to that of an OFDM symbol, its size may also be determined to correspond to a number of coherence bandwidths for convenience, as set forth below.

$$W_i=[32, 31, 30, 29, 28, \ldots, 4, 3, 2, 1] \quad (19)$$

Referring to Equation (19), a number of coherence sub-bands is determined to be thirty-two when an allowable time synchronization error is sixteen, and weighting vectors for respective coherence sub-bands are computed using Equation (19). Here, the respective weighting vectors may be changed within a range when a weight for a low-frequency sub-band of a coherence sub-band is the largest value.

Application of the weighting vectors to coarse frequency synchronization prevents the performance of coarse frequency synchronization from deteriorating due to an error occurring when a level of a received signal is too low and channel distortion is excessive. Accordingly, it is possible to further increase the effect of a coarse frequency synchronization method according to the present invention by determining a level of a signal input from an RF tuner and determining a weighting vector according to the determined level.

An equation required for coarse frequency synchronization using a weighting vector can be expanded as follows:

$$\max\left\{\sum_{m=0}^{K-1}\left|\sum_{k=m(N/K)}^{(m+1)(N/K)-1} X(k)W_m Z(((k+d))_N)\right|\right\} \quad (20)$$

where N is the number of subcarriers, K is the number of coherence sub-bands, N/K is a length BWLen of a coherence sub-band, Z(k) is a reference symbol that is pre-distorted by distorting a phase for an allowable time synchronization error, and Wm is a weighting vector. Thus, assuming that an individual subcarrier width has a coherence band $BW_s$, each coherence band $BW_s$ equals BW/K where BW is the entire bandwidth of the OFDM symbol. The number K of sub-bands may be set to be less than $2T_{off}$, where $T_{off}$ is a maximum time offset for which frame synchronization can be achieved.

The performance of coarse frequency synchronization using the subcarrier bandwidth can be improved by pre-distorting the reference symbol using a symbol time offset to increase an allowable time synchronization error and by applying a weighting vector to the coherence band to differentiate correlations between the respective coherence sub-bands.

Referring again to FIG. 4, the lengths BWLen and number K of coherence sub-bands, an allowable time synchronization error, a control value for a weighting vector, and a range of frequency offset estimation are determined (step 410). Next, the phase of a reference symbol is shifted according to an allowable time synchronization error (step 420). Next, the reference symbol is shifted by the shift amount d, thus obtaining a reference symbol Z(k+d) (step 430), and a weight W is given to the reference symbol Z(k+d) according to a weighting vector table, thus obtaining a reference symbol WZ(k+d) (step 440). Step 440 may be performed simultaneously with steps 420 and 430. After step 440, a weighted reference symbol whose phase is distorted by a symbol time offset is generated (step 450).

Assuming that N is the number of subcarriers and the predetermined shift amount d of the shifted signal received by the partial correlation unit 312 is between $$-\frac{2}{N} \text{ and } \frac{2}{N},$$

the partial correlation unit 312 of FIG. 3 calculates a partial correlation value between the received symbol X(k+d) shifted by the predetermined shift amount d and the weighted reference symbol Z(k) that is predistorted, while counting the shift amount d for each of the K coherence sub-bands, or calculating the sum $$\sum_{m=0}^{K-1}\left|\sum_{k=m(N/K)}^{(m+1)(N/K)-1} X(k)W_m Z(((k+d))_N)\right|$$

of partial correlation values (step 460). The method returns to step 420 to again shift the phase of the reference symbol until a correlation value is computed within the range off_L of frequency offset estimation and the range of allowable time synchronization error off_L (step 470).

Thereafter, the shift amount $d_{max}$ is determined from when the sum $$\sum_{m=0}^{K-1}\left|\sum_{k=m(N/K)}^{(m+1)(N/K)-1} X\times(k)W_m Z(((k+d))_N)\right|$$

input from the partial correlation unit 312 has a maximum value and the determined shift amount $d_{max}$ is output as an estimated coarse frequency offset value (step 480).

FIGS. 5A and 5B show correlation between the phase reference signal and the received signal with respect to change in symbol time offset. It is evident from these figures that coherence bandwidth varies with symbol time offset. Thus, by performing a coarse frequency synchronization algorithm after setting an appropriate coherence bandwidth, a coarse frequency offset can be effectively estimated.

As described above, using a coarse frequency synchronization method and apparatus according to the present invention, it is possible to obtain frequency synchronization that is represented by an integer multiple and improve the performance of the DAB system by applying the method to the DAB system, thereby more stably operating the DAB system.

While this invention has been particularly shown and described with reference to an embodiment thereof, it will be understood by those skilled in the art that various changes in form and details may be made therein without departing from the spirit and scope of the invention as defined by the appended claims. Thus, the scope of the present invention is limited not by the foregoing but by the following claims, and all differences within the range of equivalents thereof should be interpreted as being within the scope of the present invention.

What is claimed is:

1. A coarse frequency synchronization apparatus of an orthogonal frequency division multiplexing (OFDM) receiver, the apparatus comprising:

a buffer that receives a demodulated signal X(k) and outputs a shifted signal X(k+d) generated by cyclically shifting the signal X(k) by a predetermined shift amount d;

a controller that determines a length of a summation interval according to a phase coherence bandwidth and a number K of sub-bands into which the summation interval is divided, and generates and adjusts a symbol time offset according to the number K of sub-bands;

a weighted phase reference signal (PRS) generating unit that generates a weighted phase reference signal Z(k) whose phase is shifted by the symbol time offset and that is weighted by a weighting vector determined according to a frequency sub-band;

a counter that counts the shift amount d;

a partial correlation unit that receives the shifted signal X(k+d) and the weighted phase reference signal Z(k), calculates a partial correlation value for each of the K sub-bands; and an offset estimator that calculates the shift amount $d_{max}$ where the sum of the partial correlation values is a maximum and outputs the shift amount $d_{max}$ as an estimated coarse frequency offset value.

2. The apparatus as claimed in claim 1, wherein the partial correlation unit calculates the partial correlation value for each sub-band using the equation $$\sum_{m=0}^{K-1}\left|\sum_{k=m(N/K)}^{(m+1)(N/K)-1} X(k)W_m Z(((k+d))_N)\right|,$$

wherein N is a number of subcarriers and the predetermined shift amount d is between $$-\frac{2}{N} \text{ and } \frac{2}{N}.$$

3. The apparatus as claimed in claim 1, wherein the weighted PRS generating unit comprises:

a reference symbol generator that generates a reference symbol;

a reference symbol generator that weights the reference symbol using the weighting vector;

a phase shift generating unit that shifts the phase of the reference symbol by the symbol time offset and outputs a phase-shifted reference symbol; and a multiplication unit that multiplies the weighted reference symbol by the phase-shifted reference symbol and outputs a result of multiplication as the weighted phase reference signal Z(k).

4. The apparatus as claimed in claim 3, wherein the phase shift generating unit generates a complex number corresponding to each of a plurality of subcarriers, by which a phase is rotated, and multiplies the generated complex number by the reference symbol to generate the phase-shifted reference symbol.

5. The apparatus as claimed in claim 3, wherein the weighting vector includes a first weight allocated to a first sub-band of a first frequency and a second weight allocated to a second sub-band of a second frequency, wherein the first frequency is higher than the second frequency and the first weight is higher than the second weight.

6. The apparatus as claimed in claim 1, wherein the number K of sub-bands is set to be less than $2T_{off}$ where $T_{off}$ is a maximum time offset for which frame synchronization can be achieved.

7. The apparatus as claimed in claim 1, wherein weights in the weighting vector are directly proportional to frequencies of a corresponding frequency sub-band.

8. A coarse frequency synchronization method for use in an orthogonal frequency division multiplexing (OFDM) receiver, the method comprising:

(a) receiving a demodulated signal X(k) and outputting a shifted signal X(k+d) generated by cyclically shifting the signal X(k) by a predetermined shift amount d;

(b) determining a length of a summation interval according to a phase coherence bandwidth and a number K of sub-bands into which the summation interval is divided, and generating a symbol time offset according to the number K of sub-bands;

(c) generating a weighted phase reference signal Z(k) whose phase is shifted by the symbol time offset and that is weighted by a weighting vector determined according to a frequency sub-band;

(d) counting the shift amount d;

(e) calculating a partial correlation value between the shifted signal X(k+d) and the weighted phase reference signal Z(k) for each of the K sub-bands; and (f) determining a shift amount $d_{max}$ where the partial correlation value is a maximum and outputting the shift amount $d_{max}$ as an estimated coarse frequency error value.

9. The method as claimed in claim 8, wherein, in step (e), the partial correlation value is calculated for each sub-band using the equation $$\sum_{m=0}^{K-1}\left|\sum_{k=m(N/K)}^{(m+1)(N/K)-1} X(k)W_m Z(((k+d))_N)\right|,$$

wherein N is a number of subcarriers and the predetermined shift amount d is between $$-\frac{2}{N} \text{ and } \frac{2}{N}.$$

10. The method as claimed in claim 8, wherein step (c) comprises:

(c1) generating a reference symbol;

(c2) weighting the reference symbol using the weighting vector;

(c3) outputting a phase-shifted reference symbol whose phase is distorted by shifting the phase of the reference symbol by the symbol time offset; and (c4) multiplying the weighted reference symbol by the phase-shifted reference symbol and outputting a result of multiplication as the weighted phase reference signal Z(k).

11. The method as claimed in claim 10, wherein, in step (c3), a complex number corresponding to each of a plurality of subcarriers, by which a phase is rotated, is generated, and the generated complex number is multiplied by the reference symbol to generate the phase-shifted reference symbol.

12. The method as claimed in claim 10, wherein in step (c2) the reference symbol is weighted using the weighting vector including a first weight allocated to a first sub-band of a first frequency and a second weight allocated to a second sub-band of a second frequency, wherein the first frequency is higher than the second frequency and the first weight is higher than the second weight.

13. The method as claimed in claim 10, wherein at least two of steps (c2), (c3) and (c4) are performed simultaneously.

14. The method as claimed in claim 8, wherein the number K of sub-bands is set to be less than $2T_{off}$ where $T_{off}$ is a maximum time offset for which frame synchronization can be achieved.

15. The method as claimed in claim 8, wherein weights in the weighting vector are directly proportional to frequencies of a corresponding frequency sub-band.

* * * * *